May 1, 1962   A. W. HUGHES   3,031,716
METHOD OF BLEEDING SLAUGHTERED ANIMALS
Original Filed Sept. 26, 1955
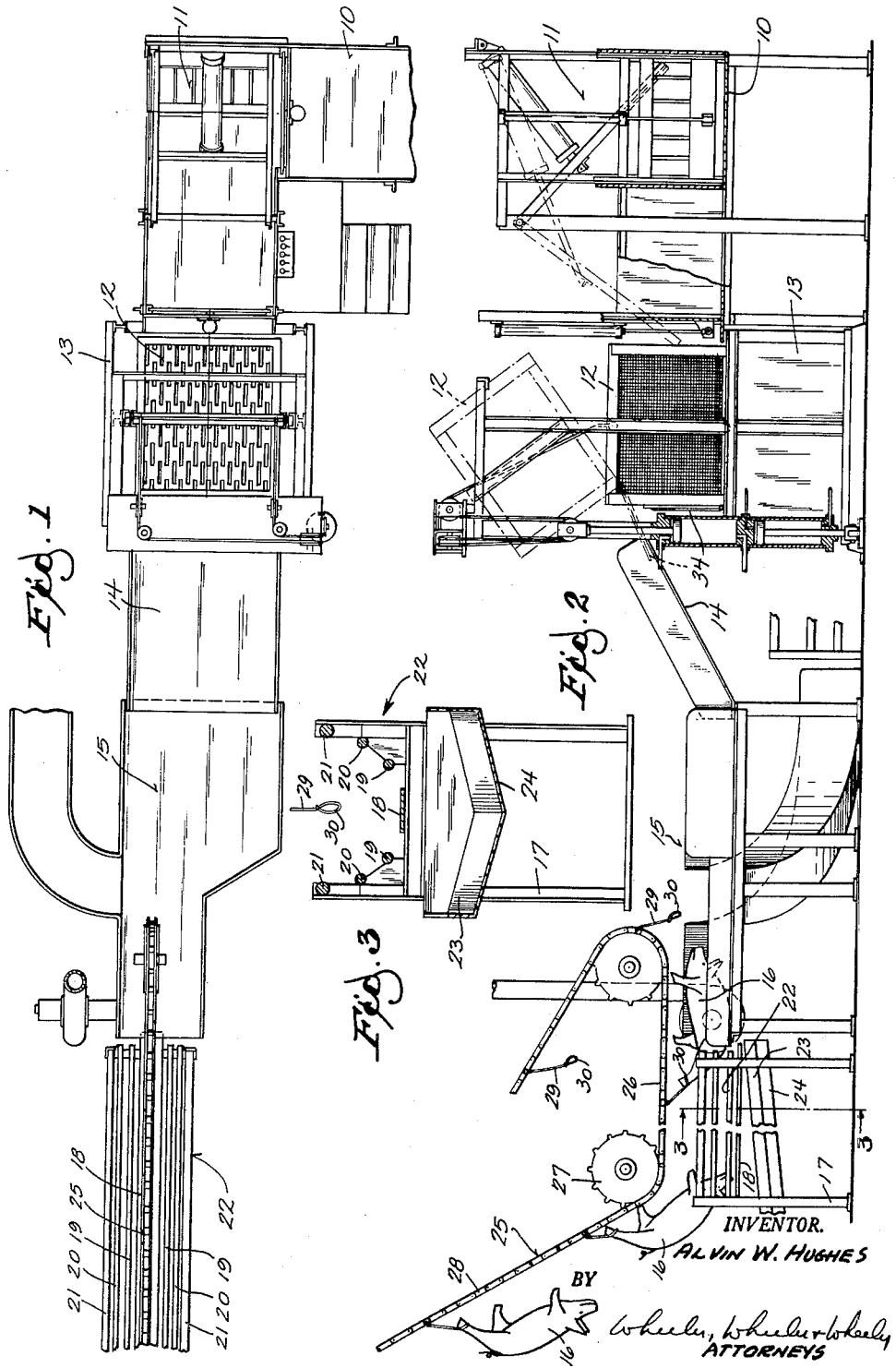
INVENTOR.
ALVIN W. HUGHES
BY
Wheeler, Wheeler + Wheeler
ATTORNEYS

United States Patent Office 3,031,716
Patented May 1, 1962

3,031,716
METHOD OF BLEEDING SLAUGHTERED ANIMALS
Alvin W. Hughes, 4N194 Church Road, Bensenville, Ill.
Original application Sept. 26, 1955, Ser. No. 536,389, now Patent No. 2,978,737, dated Apr. 11, 1961. Divided and this application Dec. 21, 1959, Ser. No. 861,079
3 Claims. (Cl. 17—45)

The present invention relates to slaughter house methods and equipment and more particularly to a method and apparatus for bleeding an animal after the voluntary processes of the animal have been immobilized by anesthetization, asphyxiation, shock, or stunning impact.

It is extremely important that the animal be bled prior to being lifted, as an animal lifted while its veins still contain blood may rupture blood vessels, thus reducing the value of the resulting meat. The present invention provides an animal-lifting shackle connected with an overhead conveyor for attachment to the animal's hoof while he lies inert in a prone position and supported from beneath after having been immobilized.

Anesthetizing the animal is a preferred means of immobilizing an animal and is described in my co-pending patent application Serial No. 839,965 and Patent 2,978,737, issued April 11, 1961. The present application is filed as a divisional application pursuant to requirement of restriction in co-pending application Serial No. 536,389, now Patent No. 2,978,737.

The shackle previously described draws the prone animal in a generally horizontal direction along a bleeding rack. The animal is stuck and bled while supported by the rack. By the time the conveyor lifts the animal away from the support of the rack the animal no longer has sufficient blood in his veins to do any damage.

Details of the foregoing structure and incidental apparatus will be described specifically with reference to the attached drawings.

FIG. 1 is a plan view of slaughter house structure including immobilizing means, a bleeding rack, and a shackle conveyor;

FIG. 2 is a side elevational view of the structure of FIG. 1.

FIG. 3 is a view taken along line 3—3 of FIG. 2.

There is shown in the drawings, and particularly with reference to FIG. 1, a loading ramp 10 leading into an animal metering chamber 11. The purpose of such structure is to control the number of animals which can be passed through the metering chamber 11 and into elevator structure 12 for the purpose of being lowered into gas chamber 13, wherein they are anesthetized for immobilization.

After the animals are anesthetized to the proper degree they collapse upon the floor of the elevator. Thereupon the elevator is raised to the dotted line position shown in FIG. 2, wherein the elevator 12 is tipped and the animals are discharged from the elevator 12 over flap 34 down chute 14. Chute 14 delivers the immobilized animal by gravity to the shackling station 15.

Extending outwardly from the shackling station 15 is a bleeding rack 22. This rack is an elongated device which comprises a frame 17. While details are unimportant, there is desirably a supporting strip 18 on which the weight of the immobilized animal 16 is carried during its progression longitudinally of the rack. At suitable spacing along the sides are tubular bars 19, 20 and 21 between which the body of the animal 16 is confined. Beneath the rack 22 there is desirably a blood collecting trough 23 which is preferably inclined or has a pitched bottom 24.

Extending longitudinally along the rack overhead is the generally horizontal run 26 of a shackle conveyor 25. Only a portion is illustrated. After passing about a sprocket 27 remote from the shackling station 15, the conveyor 25 has a run extending upwardly as shown at 28 in FIG. 2.

Depending at intervals from the conveyor are thongs 29 with shackles 30 at their ends. An attendant will engage a shackle 30 with a hoof of an immobilized animal 16 as the latter lies at the shackling station 15. Movement of the conveyor 25 will cause the shackle 30 to pull the animal 16 along the rack 22. Immediately, the animal will be stuck by opening a blood vessel in its throat.

As the animal slides along the rack 22 its blood will flow into the trough 23 and be delivered to a suitable point of collection. Meantime, when the conveyor run 28 lifts the shackle 30 and the animal 16 to which it is attached, the animal 16 will no longer have the strength to resist, nor will its veins contain blood congestion, and therefore the meat will not be damaged.

An important feature of this invention is to carry the weight of the animal along the rack until the bleeding has progressed sufficiently far so that no damage will result when the animal is lifted. The animal in prone position is supported from below with or without movement along the rack until the bleeding has rendered it incapable of effective resistance and the animal is then lifted and suspended from above, head down, for the completion of bleeding.

I claim:
1. A method of bleeding an animal to be slaughtered, comprising the steps of immobilizing the animal, supporting the immobilized animal from beneath, initiating the bleeding of the animal while so supported, and lifting the animal only after sufficient blood has been withdrawn to minimize damage to the meat.

2. The method recited in claim 1 including the step of advancing the animal while supported from beneath during the initial bleeding of the animal and continuing the advance of the animal while transferring its support to suspend the animal during final bleeding thereof.

3. A process of slaughtering and bleeding slaughter animals after the voluntary processes of said animals have been immobilized, which consists in supporting and substantially horizontally moving at slow speed a plurality of said animals, successively sticking said animals during their initial movement and continuing the movement of said animals for a predetermined time travel adequate for bleeding the stuck animals sufficiently to preclude damage to the flesh when the animals are lifted from said path, and collecting the blood from said animals as they travel through said path.

References Cited in the file of this patent
UNITED STATES PATENTS

| | | |
|---|---|---|
| 996,799 | Schmidt | July 4, 1911 |
| 1,226,598 | Roberts | May 15, 1917 |
| 2,526,037 | Murphy | Oct. 17, 1950 |
| 2,841,817 | Murphy | July 8, 1958 |
| 2,895,164 | Murphy | July 21, 1959 |